US012711198B2

(12) United States Patent
Caricato

(10) Patent No.: US 12,711,198 B2
(45) Date of Patent: Aug. 18, 2026

(54) CENTRALIZED REPOSITORY AND DATA SHARING HUB FOR ESTABLISHING MODEL SUFFICIENCY

(71) Applicant: Truist Bank, Charlotte, NC (US)

(72) Inventor: Daniel Caricato, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 921 days.

(21) Appl. No.: 17/815,731

(22) Filed: Jul. 28, 2022

(65) Prior Publication Data

US 2023/0359704 A1 Nov. 9, 2023

Related U.S. Application Data

(63) Continuation of application No. 17/661,798, filed on May 3, 2022, and a continuation of application No. 17/661,800, filed on May 3, 2022.

(51) Int. Cl.
*G06F 18/214* (2023.01)
*G06F 16/23* (2019.01)

(52) U.S. Cl.
CPC ........ *G06F 18/214* (2023.01); *G06F 16/2358* (2019.01)

(58) Field of Classification Search
CPC ..... G06F 16/2358; G06F 18/214; G06N 3/04; G06N 3/08; G06N 3/096; G06Q 10/04
See application file for complete search history.

(56) References Cited

U.S. PATENT DOCUMENTS 10,304,223 B1 * 5/2019 Ricker .................... G06F 30/00
11,195,616 B1 12/2021 Seemakurty
(Continued)

FOREIGN PATENT DOCUMENTS

AU 2021247413 A1 12/2022
CN 111684537 A * 9/2020 ............ G16H 50/20
(Continued)

OTHER PUBLICATIONS

Zhang et al., "Construction of Distributed and Heterogenous Data Sharing Platform". 2009 International Conference on Web Information Systems and Mining. IEEE Computer Society, 2009. (Year: 2009).*
(Continued)

*Primary Examiner* — Pan G Choy
(74) *Attorney, Agent, or Firm* — Michael A. Springs, Esq.; Shumaker, Loop & Kendrick, LLP; Patrick B. Horne

(57) ABSTRACT

A system for centralized transfer of model input data. A processor may receive a dataset, with an unknown actual sufficiency, and including data suitable to model behavior and for representation on a sufficiency listing. The processor may modify the sufficiency listing to include a representation of the dataset. The processor may generate sufficiency parameters in a sufficiency database utilizing a previous transfer module and a previous version of the sufficiency listing. The processor may use the dataset, the sufficiency parameters, and an artificial intelligence program to generate a dataset sufficiency-indicator and to connect the dataset sufficiency-indicator to the dataset. The processor may communicate, to a user, the dataset sufficiency-indicator and the representation of the dataset in association with the dataset to estimate the actual sufficiency of the dataset.

17 Claims, 8 Drawing Sheets

(56) References Cited

U.S. PATENT DOCUMENTS

| | | | | |
|---|---|---|---|---|
| 11,443,237 | B1 * | 9/2022 | Song | G06N 3/08 |
| 11,726,844 | B2 | 8/2023 | Chen | |
| 11,863,398 | B2 * | 1/2024 | Koodli | H04L 41/145 |
| 12,199,835 | B2 * | 1/2025 | Koodli | H04L 41/0896 |
| 2014/0173232 | A1 * | 6/2014 | Reohr | G06F 3/0611 711/162 |
| 2020/0037930 | A1 * | 2/2020 | Abramoff | A61B 5/0066 |
| 2020/0226504 | A1 | 7/2020 | Keng | |
| 2021/0200943 | A1 | 7/2021 | Aviyam | |
| 2021/0304059 | A1 * | 9/2021 | Bigaj | G06N 3/045 |
| 2021/0407678 | A1 * | 12/2021 | Arcot Desai | G16H 50/20 |
| 2023/0255564 | A1 | 8/2023 | Pascual-Leone | |
| 2024/0142920 | A1 | 5/2024 | Costa | |

FOREIGN PATENT DOCUMENTS

| | | | | | |
|---|---|---|---|---|---|
| JP | 2022549806 | A | * | 11/2022 | G06N 3/045 |
| JP | 7643692 | B2 | | 3/2025 | |
| KR | 20230135023 | A | * | 9/2023 | G06N 3/092 |
| WO | WO-2020030955 | A1 | * | 2/2020 | G06F 16/93 |
| WO | WO-2021075574 | A1 | * | 4/2021 | G06N 20/10 |
| WO | WO-2021195688 | A1 | * | 10/2021 | G06N 3/0464 |

OTHER PUBLICATIONS

Roh et al., “A Survey on Data Collection for Machine Learning—A Big Data—AI Integration Perspective”, School of Electrical Engineering, KAIST, Daejeon, Korea. Aug. 12, 2019. (Year: 2019).*

Zhang et al., “A new framework of spatial data sharing and interoperability: Spatial Data Memory Engine”. Geoinformation Science & Engineering College, Shandong University of Science and Technology, Qingdao, 266510, China. Geoinformatics 2006, (Year: 2006).*

Mou et al., “A new framework of spatial data sharing and interoperability: Spatial Data Memory Engine”. Geoinformatics 2006: Geospatial Information Technology, Proc. of SPIE vol. 6421, 642113-1. (Year:2006).

Yaman et al., “Comparative Analysis of the e-Municipality Applications in Turkey: The Case of Western Black Sea Region”. Karabuk Universitesi, I.I.B.F., Kamu Yonetimi Bolumu, Karabuk. Yonetim VE Ekonomi, Yil: 2013. (YearL 2013).

* cited by examiner 260
274
276
272
276
272
272
262
264
274
266

280
W2
W1
283
285
W1
W2
282
284A
284B
284C
286
282
284A

CENTRALIZED REPOSITORY AND DATA SHARING HUB FOR ESTABLISHING MODEL SUFFICIENCY

CROSS REFERENCE TO RELATED APPLICATIONS

This application is a continuation application tracing priority to co-pending U.S. application Ser. No. 17/661,798 filed on May 3, 2022, the entirety of which is herein expressly incorporated by reference, and tracing priority to co-pending U.S. application Ser. No. 17/661,800 also filed on May 3, 2022, the entirety of which is also herein expressly incorporated by reference.

FIELD

This invention relates generally to the field of data science, and more particularly embodiments of the invention relate to estimating the sufficiency of datasets for subsequent transfer and systems for such transfers.

BACKGROUND

AI systems, algorithms, statistical models and the like can generally be used to predict a subsequent outcome based on previous events. For instance, data representing or associated with various events (e.g., events already taken place) may be fed into an AI system, and the AI system may be configured to determine a characteristic with respect to a subsequent outcome. AI systems are typically utilized to model data including a large number of parameters, values, and the like. In many situations, a larger amount of data relevant to the subsequent outcome may increase the accuracy of a generated output from the AI system. Some AI algorithms include machine learning, in which the AI algorithm may alter internal parameters based on training data in order to increase fidelity with respect to a prediction of a characteristic of a subsequent outcome. Machine learning algorithms are typically more accurate when the data used to train the algorithm includes a large amount of data relevant to the subsequent outcome.

However, datasets, databases, datasheets, and the like (including historical and contemporary data) may be required to form inferences from AI programs, to train suitable AI programs, or both. Further, a user of an AI program may not have suitable input data to form an inference from the AI program or input data that will produce an accurate enough inference for the user of the AI program. Similarly, a user may lake data or enough suitable data to train the AI program to a sufficient degree for subsequent modeling. To alleviate such issues, the user of an AI program may desire to purchase input data, training data, and/or the like from data holders possessing the same. Data holders, on the other hand, may not know how useful or sufficient their data is for modeling purposes. Thus, data holders may not know what value to charge for the datasets and are likely to overprice or underprice the data.

In view of the circumstances described above, there is a need for a system to assist in the transfer of datasets for modeling by indicating a sufficiency of the data for modeling purposes.

BRIEF SUMMARY

Embodiments of the present invention address the above needs and/or achieve other advantages by providing systems, apparatuses, and methods that produce a sufficiency listing and/or one or more dataset sufficiency-indicators that approximate or estimate the actual sufficiency of the dataset for modeling purposes. In various embodiments, the dataset sufficiency-indicator may include an estimated value of the dataset and/or suggested price for sale of the same. Similarly, the actual sufficiency of the dataset may include the actual value of the dataset and/or a price paid by a purchaser for the transfer of the dataset. The system and associated methods may utilize a sufficiency database including sufficiency parameters associated with past datasets and/or the actual sufficiency of one or more of the datasets, such as an actual price paid for the transfer of the same, to produce dataset sufficiency-indicators. A previous transfer module may be used to produce the sufficiency parameters in the sufficiency database utilizing information related to the previous transfer of datasets. In exemplary embodiments, an AI program or associated instructions may be configured to receive the dataset and, based on the sufficiency database, generate the dataset sufficiency-indicator. Thereafter, the dataset sufficiency-indicator may be communicated to the user, and thus inform the user of an estimated sufficiency of the dataset for modeling purposes, such as an estimated value of the dataset and/or a recommended price for the dataset.

Aspects of the present subject matter are directed to a system for centralized transfer of model input data. The system includes a computer including one or more processor and at least one of a memory device and a non-transitory storage device. The processor(s) of the system is configured to execute a number of instructions, one of which is to receive a dataset including data that is suitable to use as input to model behavior and for subsequent representation on a sufficiency listing. Furthermore, the actual sufficiency of the dataset is unknown. Another instruction is to modify the sufficiency listing to include a representation of the dataset. A further instruction includes to generate sufficiency parameters in a sufficiency database utilizing a previous transfer module, the previous transfer module configured for interfacing with at least one previous version of the sufficiency listing. One instruction is to generate, based on data of the dataset and the sufficiency parameters of the sufficiency database, a dataset sufficiency-indicator using an artificial intelligence program. Another instruction is to connect the dataset sufficiency-indicator to the dataset. An additional instruction is to communicate to a user of the system the dataset sufficiency-indicator of the dataset and the representation of the dataset in association with the dataset. Thus, the dataset sufficiency-indicator allows the user to estimate the actual sufficiency of the dataset.

In at least one embodiment, the actual sufficiency may include a value of the dataset. Additionally or alternatively, the instruction to connect the dataset sufficiency-indicator to the dataset may include to modify the sufficiency listing to include the dataset sufficiency-indicator in association with the representation of the dataset. In an additional or alternative embodiment, the instruction to connect the dataset sufficiency-indicator to the dataset may include to associate a tag with the dataset representative of the dataset sufficiency-indicator. In some embodiments, the data of the dataset may include synthetic data. In additional or alternative embodiments, the processor(s) may be further configured to execute instructions to generate, from the data of the dataset, a synthetic dataset including synthetic data suitable for a subsequent transfer.

In an additional or alternative embodiment, the sufficiency parameters may include at least one actual sufficiency for a previously transferred dataset, a size of the previously transferred dataset, a time-period since the transfer of previously transferred dataset, a granularity of the data of the previously transferred dataset, a system retention time between when the previously transferred dataset was received by the system and the transfer of the previously transferred dataset, or a population associated with the previously transferred dataset. Additionally or alternatively, the previous transfer module may be further configured to retrieve at least one external sufficiency parameter including a real-time sufficiency adjustment. The real-time sufficiency adjustment may include at least one inflation indicator, a consumer confidence indicator, a consumer sentiment indicator, a size of an external dataset, a time-period since a transfer of the external dataset, a granularity of the data of the external dataset, a retention time before the transfer of the external dataset, a population associated with the external dataset, a sufficiency indicator for the external dataset, or an actual sufficiency for the transfer of the external dataset.

In some embodiments, the sufficiency parameters of the sufficiency database may be utilized to train the artificial intelligence program. Additionally or alternatively, the dataset sufficiency-indicator may be an inference of the artificial intelligence program. In further or alternative embodiments, the artificial intelligence program may include a machine learning algorithm. In additional or alternative embodiments, the artificial intelligence program may include a neural network. In a further or alternative embodiment, the processor(s) may be further configured to execute instructions to receive, from the user, a sufficiency purge value and generate a communication to the user when the dataset sufficiency-indicator is greater than the sufficiency purge value.

In another aspect, the present subject matter is direct to a system for centralized transfer of model input data. The system includes a computer including one or more processor and at least one of a memory device and a non-transitory storage device. The processor(s) of the system is configured to execute a number of instructions, one of which is to receive a dataset including data that is suitable to use as input to model behavior and for subsequent representation on a sufficiency listing. Furthermore, the actual sufficiency of the dataset is unknown. A further instruction includes to receive sufficiency parameters from a sufficiency database, the sufficiency parameters generated from at least one previous version of the sufficiency listing. One instruction is to generate, based on data of the dataset and the sufficiency parameters of the sufficiency database, a dataset sufficiency-indicator using an artificial intelligence program. Another instruction is to modify the sufficiency listing to include a representation of the dataset and the dataset sufficiency-indicator in association with the representation of the dataset. An additional instruction is to communicate to a user of the system the dataset sufficiency-indicator of the dataset and the representation of the dataset in association with the dataset. Thus, the dataset sufficiency-indicator allows the user to estimate the actual sufficiency of the dataset.

In at least one embodiment, the processor(s) may be further configured to execute instructions to generate at least one sufficiency parameter in the sufficiency database utilizing a previous transfer module. Additionally, or alternatively, the actual sufficiency may include a value of the dataset. In some embodiments, the sufficiency parameters of the sufficiency database may be utilized to train the artificial intelligence program. Additionally or alternatively, the dataset sufficiency-indicator may be an inference of the artificial intelligence program.

In another aspect, the present subject matter is directed to a method of adding a dataset to a sufficiency listing utilized for the transfer of model input data. The method includes communicating a dataset including data that is suitable to use as input to model behavior and for subsequent representation on the sufficiency listing. Further, the actual sufficiency of the dataset is unknown. The method further includes modifying the sufficiency listing to include a representation of the dataset. The method also includes communicating sufficiency parameters from a sufficiency database. The sufficiency parameters are generated from at least one previous version of the sufficiency listing. Additionally, the method includes generating, based on data of the dataset and the sufficiency parameters of the sufficiency database, a dataset sufficiency-indicator using an artificial intelligence program. The further includes connecting the dataset sufficiency-indicator to the dataset. The method further includes communicating to a user of the system the dataset sufficiency-indicator of the dataset and the representation of the dataset in association with the dataset.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
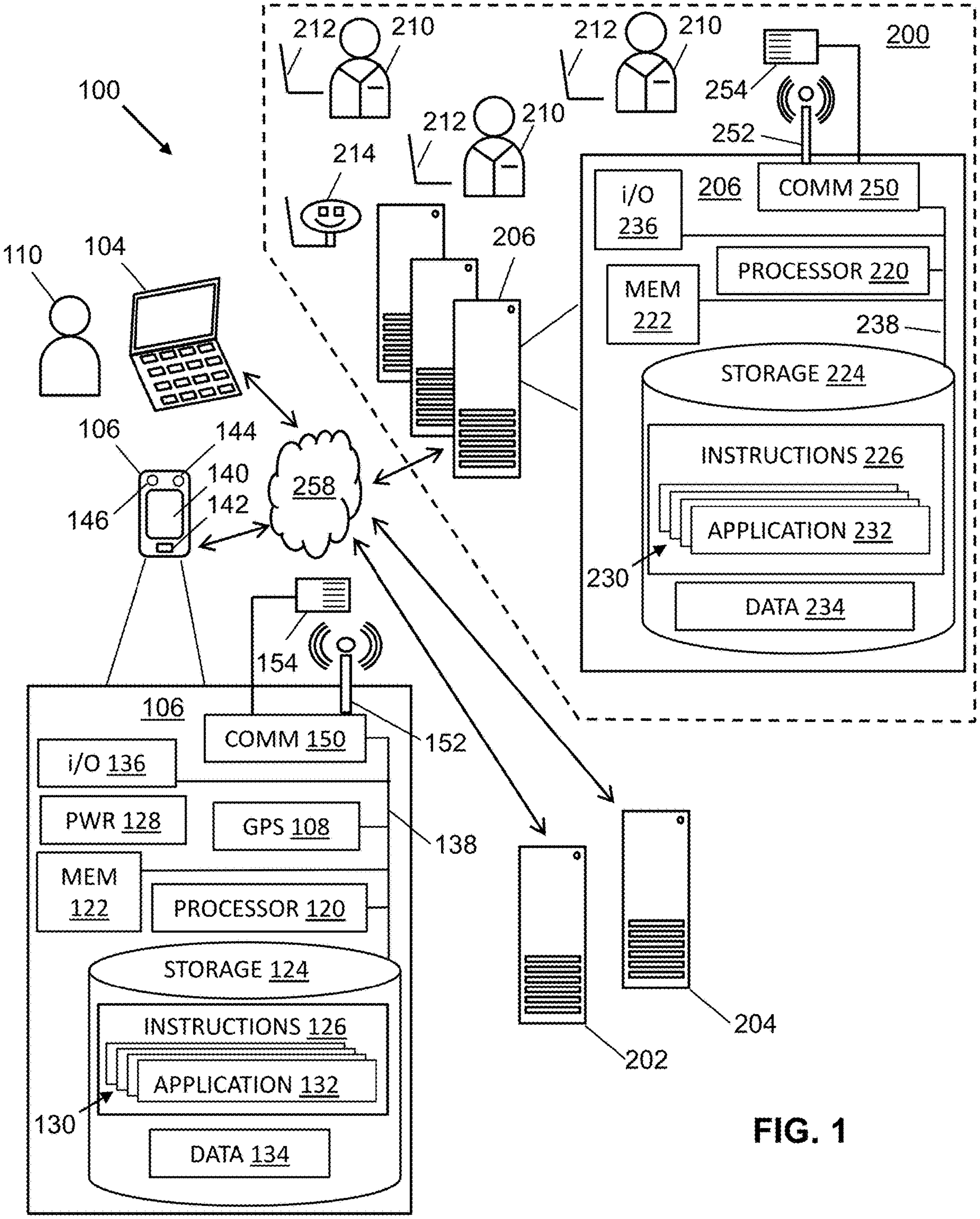

Having thus described embodiments of the invention in general terms, reference will now be made to the accompanying drawings, wherein:

FIG. 1 illustrates an enterprise system, and environment thereof, according to at least one embodiment.

Figure 2A:
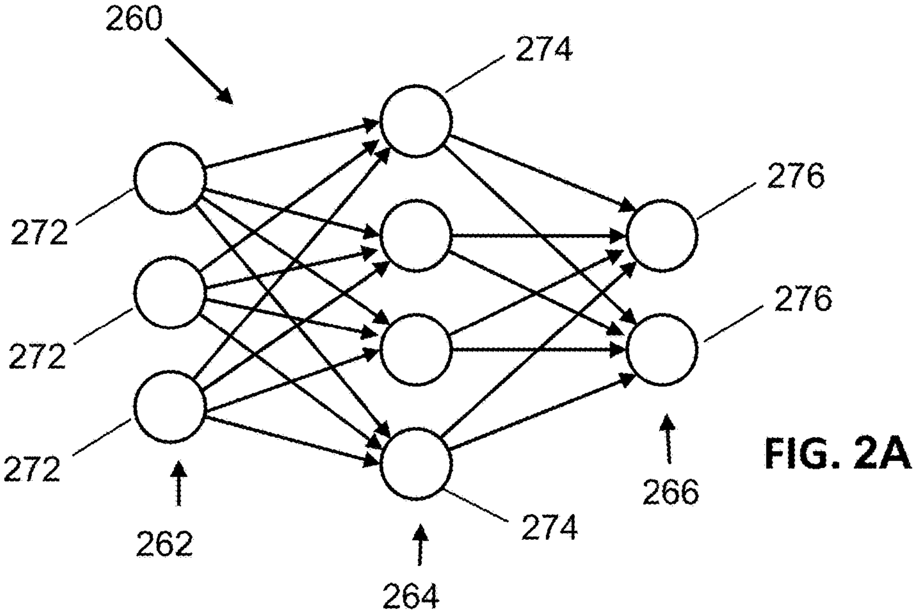

FIG. 2A is a diagram of a feedforward network, according to at least one embodiment, utilized in machine learning.

Figure 2B:
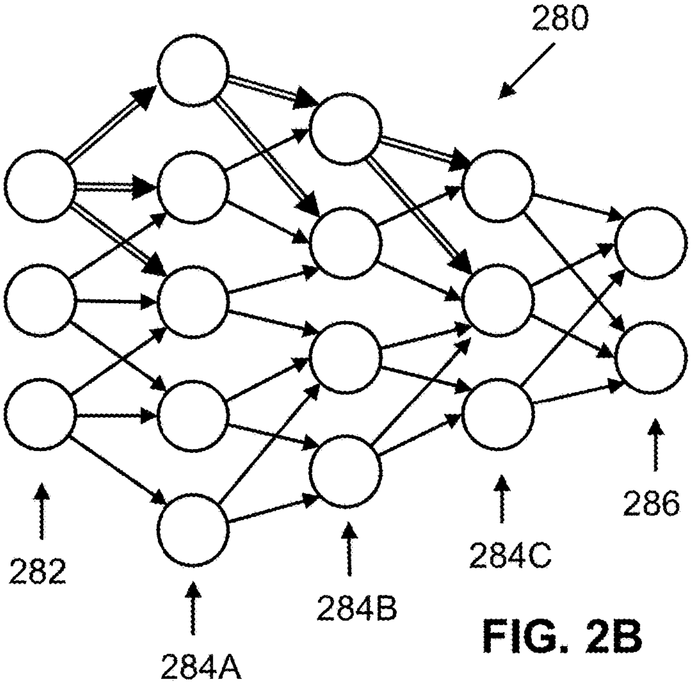

FIG. 2B is a diagram of a convolution neural network, according to at least one embodiment, utilized in machine learning.

Figure 2C:
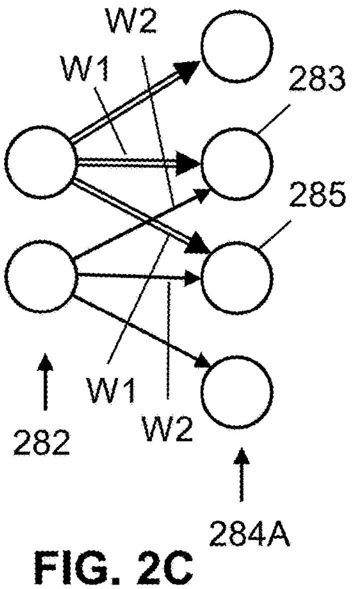

FIG. 2C is a diagram of a portion of the convolution neural network of FIG. 2B, according to at least one embodiment, illustrating assigned weights at connections or neurons.

Figure 3:
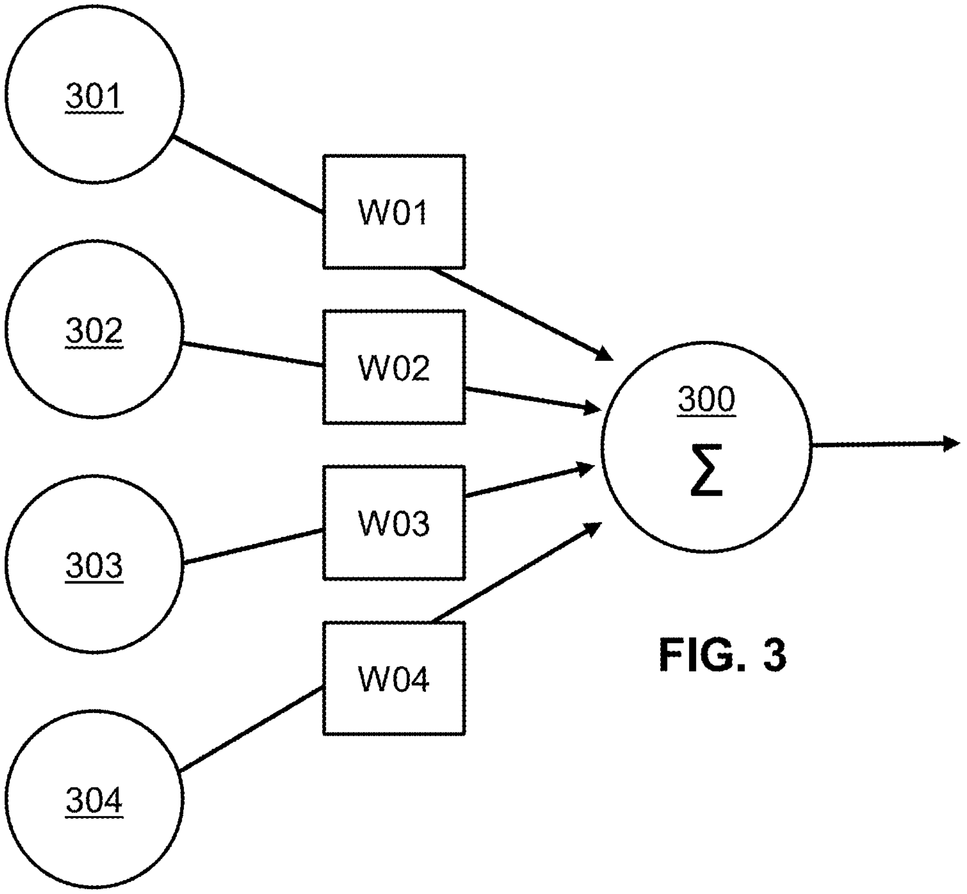

FIG. 3 is a diagram representing an exemplary weighted sum computation in a node in an artificial neural network.

Figure 4:
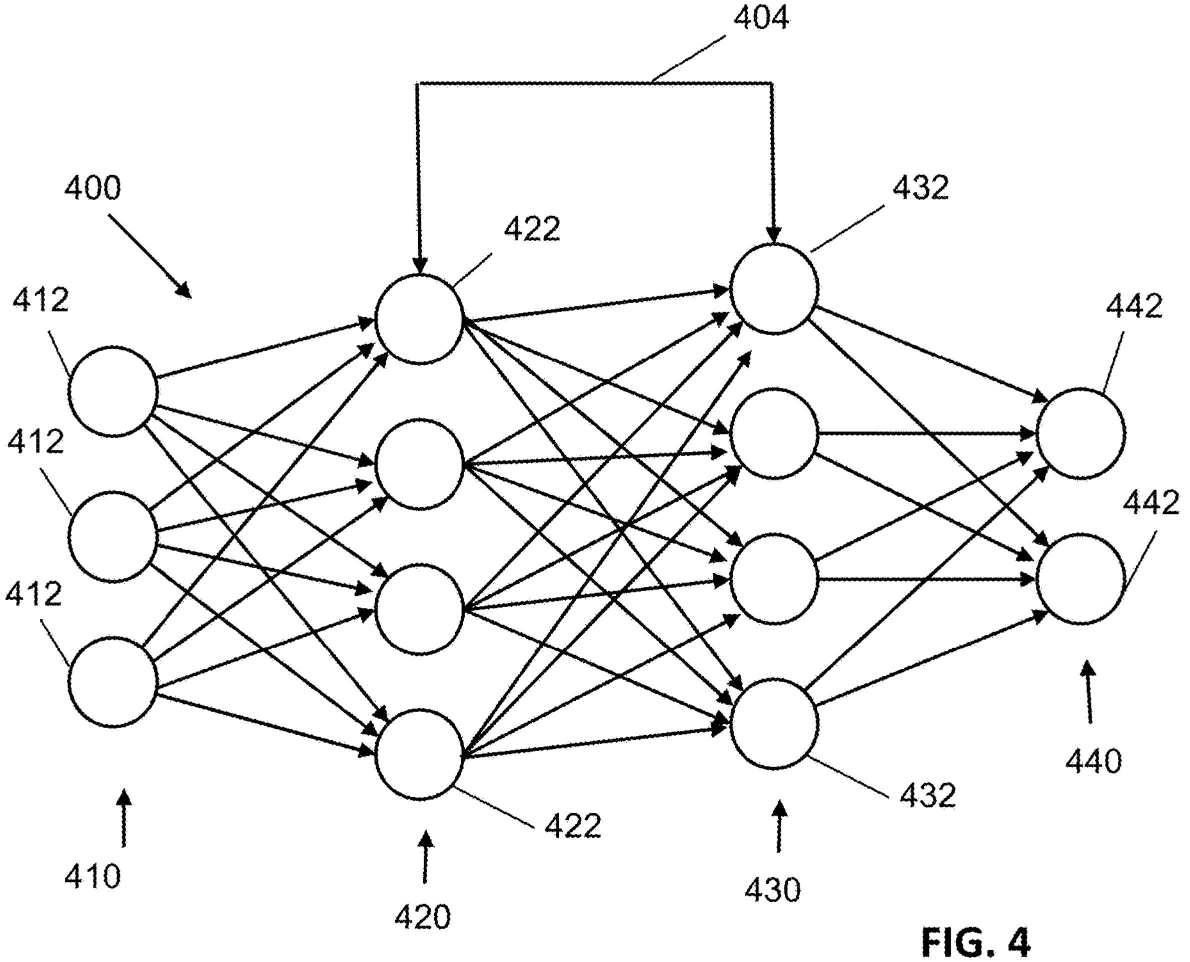

FIG. 4 is a diagram of a Recurrent Neural Network RNN, according to at least one embodiment, utilized in machine learning.

Figure 5:
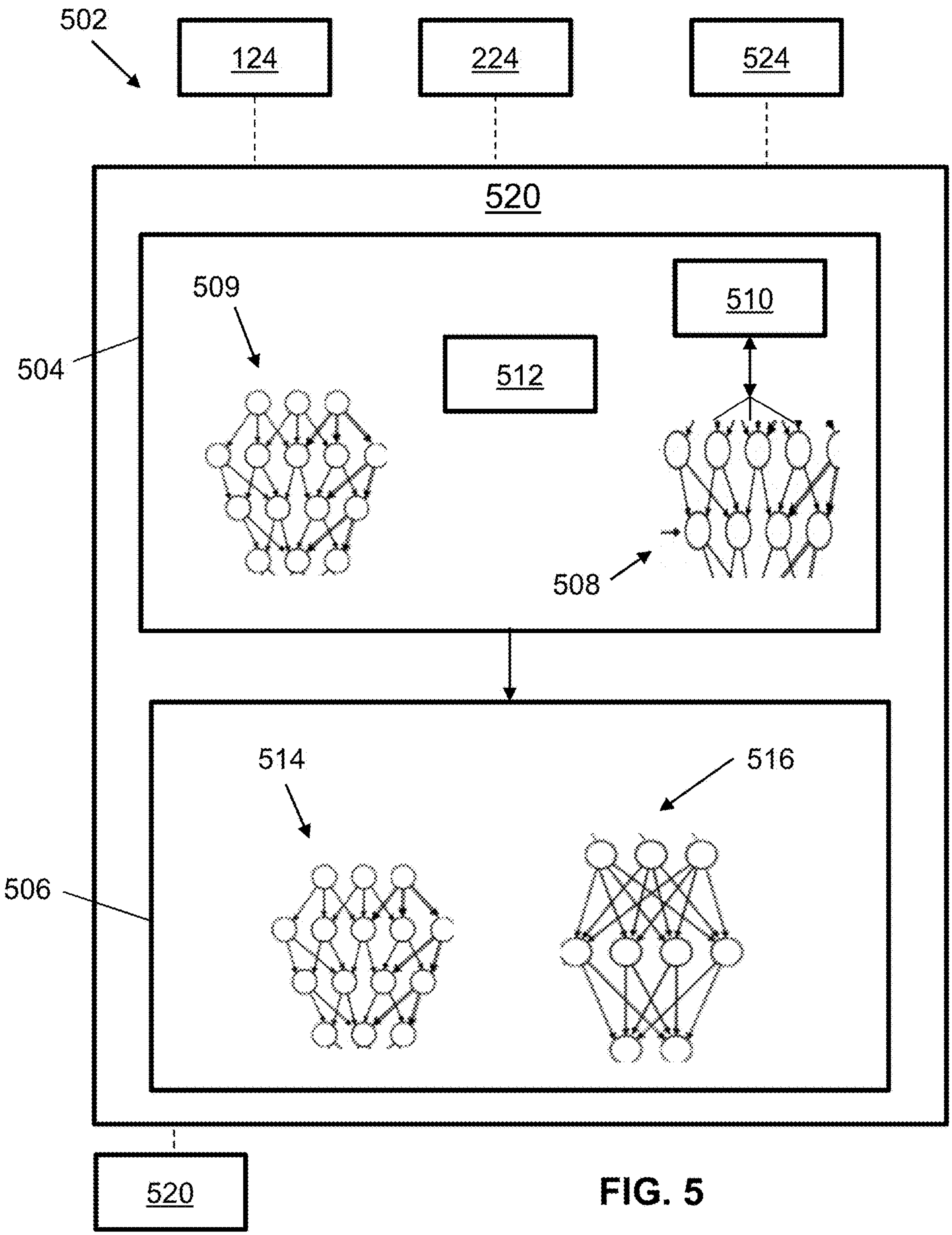

FIG. 5 is a schematic logic diagram of an artificial intelligence program including a front-end and a back-end algorithm.

Figure 6:
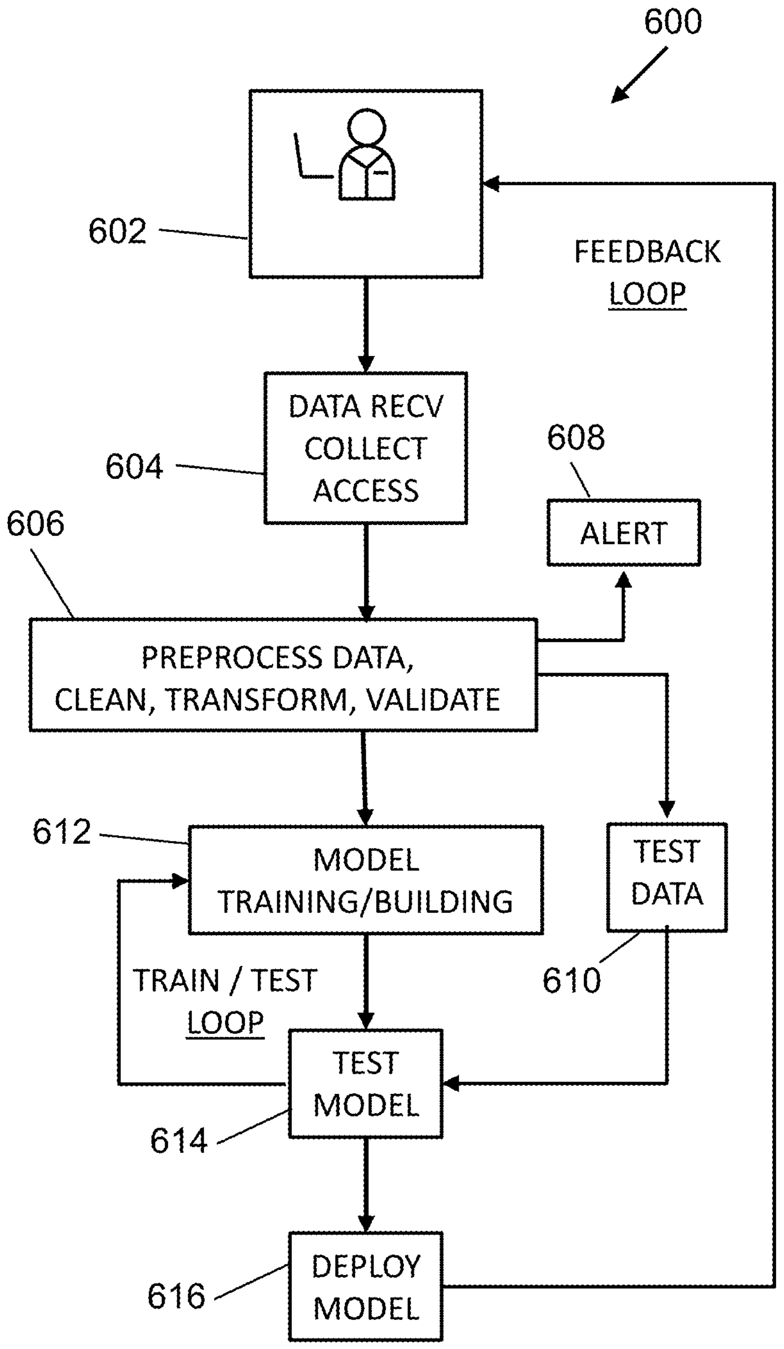

FIG. 6 is a flow chart representing a method, according to at least one embodiment, of model development and deployment by machine learning.

Figure 7:
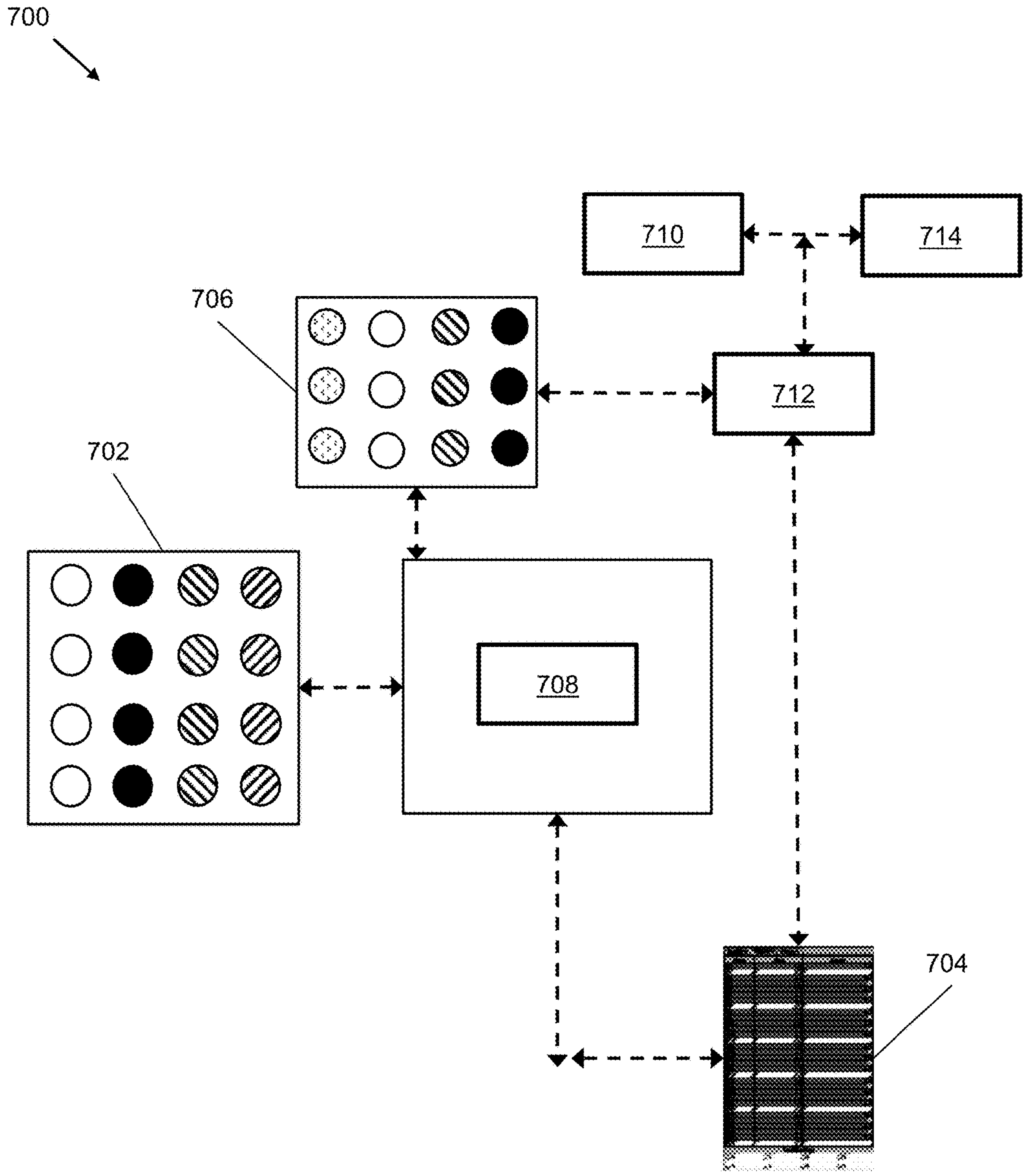

FIG. 7 illustrates one embodiment of a system for centralized transfer of model input data, in accordance with aspects of the present subject matter.

Figure 8:
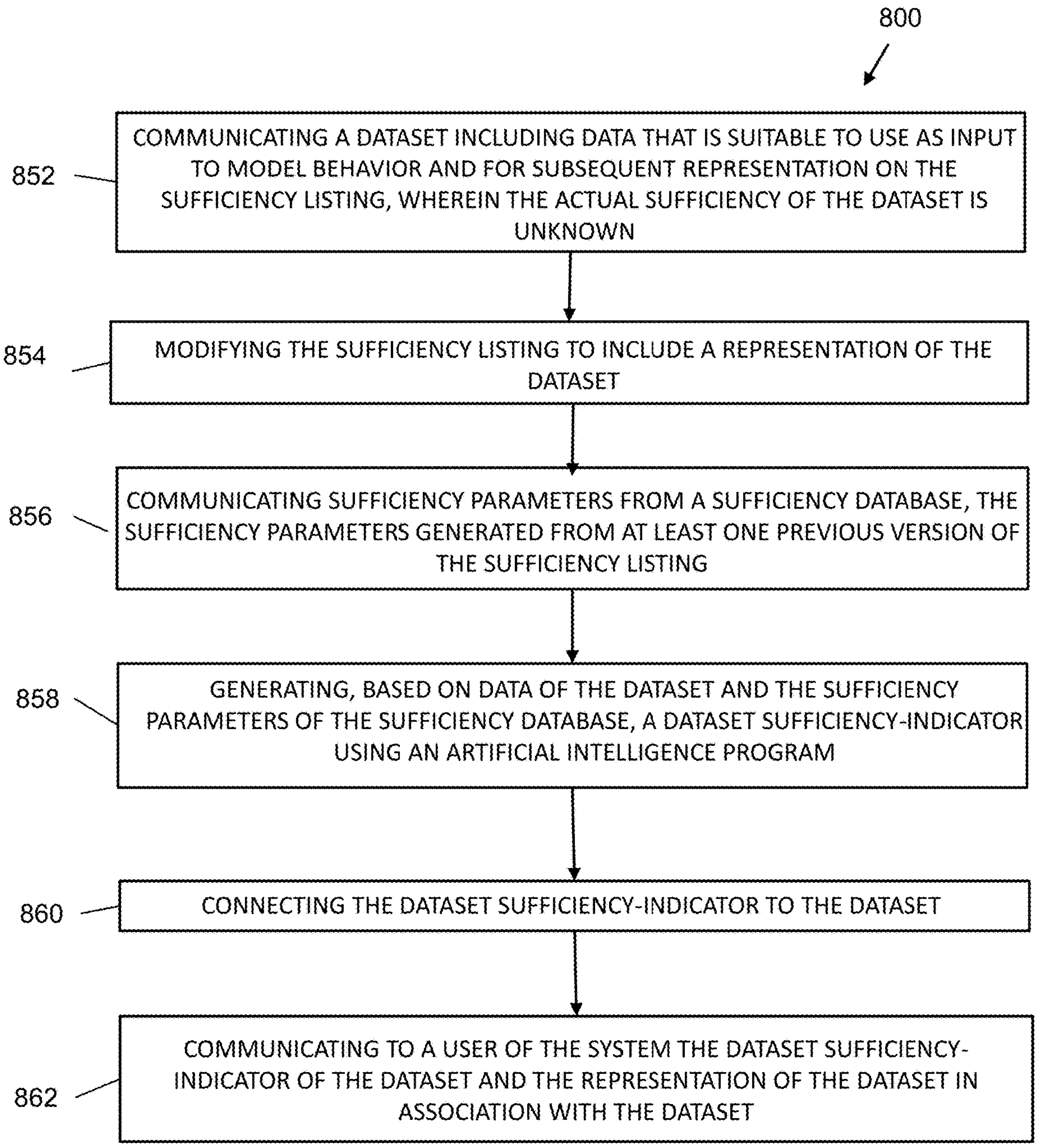

FIG. 8 illustrates one embodiment of a method of adding a dataset to a sufficiency listing utilized for the transfer of model input data, in accordance with aspects of the present subject matter.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions, instructions, and/or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wide-band (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence engine (e.g., an artificial intelligence system, artificial intelligence algorithm, artificial intelligence module, program, and the like) generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence engine may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program

504 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

With reference to the general architecture, features, and function of AI engines as described above, such as neural networks and other machine learning algorithms, the present subject matter is also directed to applications for a system that provides a centralized location (e.g., a virtual location association with a website, application, or the like) for users to transfer model input data. Generally, model input data may be stored in a digital format such as a spreadsheet, a database, or the like and is generally suitable to assist in modeling behavior. For example, such a dataset may be utilized as an input to a AI program and/or machine learning algorithm, and the model may generate an inference based on the dataset. In some embodiments, the inference may be a prediction of future or subsequent event and/or the probability of a subsequent event, e.g., the likelihood of consumers having the a need for goods or services in the near or moderately-extended future, or the likelihood of consumers making purchases in the near or moderately-extended future. The accuracy of an inference may be limited by the quality of the input data and data used to train the associated AI program. Generally, a dataset with high sufficiency may allow for an accurate inference produced using the AI algorithm. In some embodiments, the sufficiency of the dataset may include a value of the dataset for modeling purposes. Additionally or alternatively, the sufficiency of the dataset may include a monetary value and/or a value a user would receive for transferring (e.g., selling, leasing, licensing, etc.) the dataset to another party.

The other party (transferee of the dataset) may be a second user of the system that has a need for the dataset. More particularly, the second user may be a buyer that subsequently receives the dataset in exchange for consideration, such as monetary value. The future monetary value given in exchange for dataset controls the actual value of the dataset and thus the actual sufficiency of the dataset. Generally, the system utilizes actual sufficiency values for datasets previously transferred on the system and the data of the user's dataset to determine an estimate of the sufficiency of the user's dataset. In one instance, the actual sufficiency values include the monetary values associated with the previous transfers, and the estimated sufficiency generated for the user's dataset may be the current value of the user's dataset. Various embodiments of the system disclosed herein may provide the user with a dataset sufficiency-indicator so that the user understand estimate the actual sufficiency, value, monetary value, etc. prior to transferring the dataset. Alternatively, the dataset sufficiency-indicator may be considered by the user in selecting a price to offer the dataset for sale, thus avoiding overestimating or underestimating the sufficiency of the dataset as input data for modeling.

In an exemplary embodiment and as illustrated schematically with reference to FIG. 7, a system architecture 700 is generally suitable to initially generate and/or modify a sufficiency listing 704 to represent a dataset (e.g., dataset 702) uploaded by the user. The dataset 702, may include at least one spreadsheet, a database, or similar data repository. Particularly, embodiments disclosed herein may utilize historical data from transfers on or associated with the system 700 stored in a spreadsheet, database, or similar data repository (see, e.g., sufficiency database 706) to produce an estimate of the actual value of user's dataset 702 or a dataset sufficiency-indicator, as used herein.

In the embodiment of FIG. 7, AI program 708 is illustrated using sufficiency database 706 to generate the sufficiency listing 704, includes a representation of the user database 702, for the purposes of ease of discussion. However, it should be appreciated that the system 700 may be configured to interface with any number of additional databases. For example, system 700 may be communicatively coupled to an internal repository 710, which includes additional data that may improve the accuracy of the dataset sufficiency-indicator generated by the AI program 708. In some embodiments, the internal repository 710 may include actual sufficiency values for previously transferred datasets, actual monetary values for previously transferred datasets, previous versions of the sufficiency listing 704, similar databases/datasets that include representations of model data and the respective actual sufficiencies for the same (such as purchase price for a transfer of datasets), and/or information associated with the datasets transferred (e.g., dataset size, type, granularity, etc.). Additionally or alternatively, the databases/datasets of the data repository 710 may be designated by an administrator of the system 700. In some embodiments, the AI program 708 may interface with the internal repository 710 directly or through one or more intermediate components, as shown. In some additional or alternative embodiments, some or all of the data within the data repository 710 may be reproduced on the sufficiency database 706 for use by the AI program 708.

The system 700 may include a previous transfer module 712 for interfacing with one or more of the sufficiency database 706, the sufficiency listing 704, the internal repository 710, or external data source 714 (as explained in more detail below). In some embodiments, the transfer module 712 may allow for the AI program 708 to interface with the sufficiency listing 704. In some embodiments, the system 700 may include a similarly configured interface to allow the AI program to modify the sufficiency listing 704. The AI program 708 may be used to generate the dataset sufficiency-indicator for the user dataset 702 and associate the sufficiency-indicator with a representation of the dataset 702 within the sufficiency listing 704. The AI program 708 may be configured to implement a number of AI algorithm instructions (such as a portion of the associated instruction up to all of the associated instructions), AI subroutines, and the like, as described herein and in more detail below.

Thus, FIG. 7 illustrates an architecture of the exemplary system 700 with programs, subprograms, related or associated programs, and data repositories that are suitable for implementing various of the elements of methods, steps, instructions, and the like discussed herein. However, the following discussion is equally applicable to other suitable configurations of systems. In various embodiments, one or more of the schematic elements may be combined or arranged alternatively. For example, the previous transfer module 712, or a portion thereof, may be included in the AI program 708, the sufficiency database 706, the internal repository 710, and/or external data source 714. Further, the previous transfer module 712 and AI program 708 may be formed together as a single program or may be arranged as a subsystem or assembly including multiple subroutines, programs, and the like.

It should be appreciated that the system 700, AI program 708, and/or sufficiency database 706 may provide the user(s) a single place or application to determine an efficiency-indicator for the user's dataset 702. Thus, by uploading the user's dataset 702, the AI program 710 may utilize data of the same and historical data from the sufficiency database 706 to form an estimated value for the dataset 702. In some embodiments, the system 700 may be configured to allow the user to transfer the dataset 702 for monetary value, and thus establish the actual sufficiency.

For instance and when estimating the actual sufficiency of the dataset 702, the produced dataset sufficiency-indicator in the sufficiency listing 704 may include a value or indicator of a value for sale or transfer of the dataset 702 that is neither underinflated or overinflated with respect to the dataset's actual value and/or actual sufficiency as input data for modeling purposes. Thus, a user does not have to theorize or guess the sufficiency of dataset 702 prior to transferring the same to another user and avoids overpricing or underpricing the dataset 702 for transfer. In some instances, underestimating the sufficiency of the dataset 702 for modeling purposes may reduce the value the user receives for transfer of the dataset 702. In other instances, overestimating the sufficiency of the dataset 702 for modeling purposes may result in more time before a transferee chooses to pay an the desired amount for the transfer of the dataset, or no other party or user may be willing to pay an overinflated price reflected by the overestimated sufficiency of the dataset 702.

Additionally or alternatively, the AI algorithm 708 may require or be capable of training utilizing training data (e.g., previous datasets offered for transfer and attributes of datasets in association with known outputs). The known outputs may include at least one of the actual sufficiency, the value, and/or monetary value exchanged for transfer of the previous dataset. In some embodiments, the AI program 708 may include a machine learning algorithm requiring training or configured such that the machine algorithm may be trained to increase an accuracy, efficiency, or processing speed when used to generate an inference, e.g., the dataset sufficiency-indicator. In some embodiments, the AI program 708 may include at least one of a neural network, deep neural network, a CNN, a front-end algorithm, a back-end algorithm, statistical models or machine learning programs such as decision tree learning, associate rule learning, recurrent artificial neural networks, support vector machines, and the like. Additionally or alternatively, the AI program 708 may be associated with instructions related to one or more of a neural network, a deep neural network, a CNN, a front-end algorithm, a back-end algorithm, statistical models or machine learning programs such as decision tree learning, associate rule learning, recurrent artificial neural networks, support vector machines, and the like as described herein.

While exemplary embodiments of suitable AI configurations are discussed herein, such as below, other embodiments of the AI program 708 may include other, suitable configurations of AI architectures, such as configurations of an AI system similar to the basic feedforward network 260, the RNN 400, the AI program 502, the front-end algorithm 504, and/or the back-end algorithm 506 of FIGS. 2A, 2B, 4, & 5, respectively. It should be appreciated that different AI systems generally suitable to perform the required task of the program and/or instructions thereof may produce more accurate or faster results and/or reduce the processing power required to perform the task (e.g., AI systems generally suitable for predicting an outcome to an input after teaching and/or training the AI system using input data with known outputs). As such, certain types of AI programs suitable for use with the AI program 708 may require training, e.g., machine learning algorithms, support vector machines, and the like. An exemplary procedure for training a machine learning algorithm to generate the dataset sufficiency-indicator is described below (e.g., a portion of the instructions associated with the AI program 708).

Furthermore, the data for training the AI program 708 can include at least a portion of the data of the sufficiency database 706. Such data used to train the AI program 708 (e.g., sufficiency parameters) may be generated from previous versions of the sufficiency listing 704 (e.g., a previous version of the sufficiency listing 704*a*), data of previous versions of the sufficiency listing 704*a*, and/or or data associated with previous versions of the sufficiency listing 704*a*. In one example, the transfer module 712 may receive a communication including the actual sufficiency of the user's dataset 702 in response to the transfer of the dataset 702 to another user. The transfer module 712 may generate sufficiency parameters in the sufficiency database 706 based on one or more previous versions of the sufficiency listing 704*a* and the actual sufficiency of the dataset 702 transferred. For instance, the actual sufficiency and/or market value exchanged in the transfer of the dataset 702 may define the known output (an actual efficiency and/or a correct dataset sufficiency-indicator) utilized to train the AI program 708.

It should be appreciated that sufficiency parameters created from previous versions of the sufficiency listing 704*a* may be generated, at least partly, before the transfer of the dataset 702. For example, when a dataset 702 is communicated to the system 700, sufficiency parameters associated with the concurrent sufficiency listing 704 (i.e., including the dataset 702) may be stored directly in the sufficiency database 706 or within the internal repository 710 for later retrieval (e.g., a previous version of the sufficiency listing 704*a* at a future time when the associated dataset 702 is transferred).

In some embodiments, the previous transfer module 712 may retrieve sufficiency parameters stored within the internal repository 710 and/or may generate the sufficiency parameters from the raw data associated with the previous version of the sufficiency listing 704*a* and/or or data associated with the transferred dataset 702. Sufficiency parameters associated with the previous version of the sufficiency listing 704*a* and/or the actual sufficiency value may be stored and/or generated in the sufficiency database 706 for use in future training of the AI program 708, as input data and known output data, respectively. In some further or alternative embodiments, the sufficiency parameters may include at least one actual sufficiency for a previously transferred dataset 702*a*, a size of the previously transferred dataset 702*a*, a time-period since the transfer of previously transferred dataset 702*a*, a granularity of the data of the previously transferred dataset 702*a*, a system retention time between when the previously transferred dataset 702*a* was received by the system 700 and the transfer of the previously transferred dataset 702*a*, or a population associated with the previously transferred dataset 702*a*.

The sufficiency database 706 used for training the machine learning algorithm may be supplemented with additional data needed or desired to train the AI program 708, e.g., to perform supervised learning. For example and as shown in FIG. 7, the previous transfer module 712 may be configured to communicate with (e.g., receive information, generate sufficiency parameters, and the like) one or more external data sources 714. Particularly and in some embodiments, the previous transfer module 712 may retrieve at least one external sufficiency parameter for inclusion in the sufficiency database 706. Thus, the sufficiency database 706 may a real-time sufficiency adjustment and/or the external sufficiency parameter(s) generated from the external data source(s) 714. Additionally or alternatively, the external sufficiency parameter(s) and or real-time sufficiency adjustment may include one or more of an inflation indicator, a consumer confidence indicator, a consumer sentiment indicator, a size of an external dataset, a time-period since a transfer of the external dataset, a granularity of the data of the external dataset, a retention time before the transfer of the external dataset, a population associated with the external dataset, a sufficiency indicator for the external dataset (e.g., a requested value for transfer of the external dataset), and/or an actual sufficiency for the transfer of the external dataset.

Supervised learning is a machine learning training approach that is defined by its use of labeled datasets. These datasets are designed to train or "supervise" algorithms into classifying data or predicting outcomes accurately. Using labeled inputs and outputs, the machine learning algorithm can measure its accuracy and learn over time. Both satisfactory and unsatisfactory outcome examples may be included in training, as the machine learning algorithm learns from both types of scenarios. Furthermore, ongoing training may be periodically performed on the machine learning algorithm using new or additional examples, such as user provided feedback (positive and/or negative) with respect to inferences (i.e., dataset sufficiency indicators) during use or the actual sufficiencies of the respective datasets 702 established during subsequent transfers. Thus, periodic ongoing training can further improve the efficiency and effectiveness of the machine learning algorithm for user interaction and/or a similar AI architecture of the AI program 708 suitable for such training.

Thus, the AI program 708 may include and/or be associated with one or more instructions to generate, based on data of the dataset 702 and the sufficiency parameters of the sufficiency database 706, the dataset sufficiency-indicator approximating or estimating the actual sufficiency of the dataset 702 for use as input to model behavior. In some embodiments, at least a portion of the system 700, the AI program 708, and/or the previous transfer module 712 may be implemented on the processing device 120, the processing device 220, the AI processor 520, and/or one or more dedicated processing device or processing devices associated with the system 700. In some embodiments, various instructions associated with the system 700, such as the AI program 708 and/or the previous transfer module 712 may be implemented on the AI processor 520, and/or one or more dedicated processing device or processing devices associated with the system 700. In various embodiments, instructions associated with the system 700 and/or components or subprograms thereof may be stored in an associated memory device and/or storage device of the system (e.g., memory device 124 and/or memory device 224) communicatively coupled to the associated processor(s). Additionally or alternatively, the system 700 may include one or more memory devices and/or storage devices for processing use and/or including one or more instructions necessary for operation of the system 700, the AI program 708, and/or the previous transfer module 712.

In some embodiments, the system 700 may be configured to modify the sufficiency listing 704 to include a representation of the dataset 702 and/or the dataset sufficiency indicator. The representation of the dataset 702 may include a title, description, and/or one or more attributes of the dataset 702. For example, the representation of the dataset 702 may include some or all of the information that may be used to subsequently form sufficiency parameters with reference to the dataset 702. In some embodiments, the AI program 708 and/or interface 712 may be configured to read, modify, or generate the sufficiency listing 704. In some embodiments, the system 700 may include one or more dedicated interfaces configured to allow the system to interact and/or form the sufficiency listing 704.

Subsequent to generation of the dataset sufficiency indicator, the system 700 may generally connect, associate, or otherwise couple the dataset sufficiency-indicator to the dataset 702 and/or the representation of the dataset 702 within the sufficiency listing 704. For instance, the dataset sufficiency-indicator may be generated in the sufficiency listing 704 and associated with the respective representation of the dataset 702. In additional or alternative embodiments, the system 700 may be configured to associate the dataset 702 and/or the representation of the dataset 702 within the sufficiency listing 704 with a tag representing the dataset sufficiency-indicator. The system 700 may generally communicate to a user of the system 700 the dataset sufficiency-indicator of the dataset 702 and the representation of the dataset in association with the dataset 702. Thus, the dataset sufficiency-indicator allows the user to estimate the actual sufficiency of the dataset 702. In some embodiments, the system 700, AI program 708, the previous transfer module 712, and/or one or more dedicated programs, subprograms, or the like may be configured to communicate the sufficiency-indicator using an output file, display, and/or graphical user interface associated with system 708.

Additionally or alternatively, the user may communicate a sufficiency purge value for the dataset 702, and the system 700 may generally associate the sufficiency purge value with the dataset, such as within the sufficiency listing 704, a tag, or the like. The system 700 may monitor subsequent updates to the dataset sufficiency indicator for the dataset 702 associated with the purge value and notify or cause a notification to be communicated to the user that the new dataset sufficiency-indicator connected to the dataset 702 is greater than the user inputted purge value. This notification may inform the user that the actual sufficiency of the dataset is high enough to consider transfer by the user. For example, the system 700 may generally receive new training data and store the same within the sufficiency database 706. Such training data (e.g., the sufficiency parameters) may be added to the sufficiency database 706 at regular intervals, in response to a communication caused to be generated by the user, automatically or semi-automatically in response to new actual sufficiency values for datasets 702 within the sufficiency listing 704 and/or sufficiency database 706, and/or automatically or semi-automatically in response to new or modified external sufficiency parameter(s) generated from the external data source(s) 714.

Referring now to FIG. 8, an exemplary embodiment of a method 800 is illustrated for adding a dataset to a sufficiency listing utilized for the transfer of model input data. The method 800 may be utilized with the system 700, similarly, or suitably configured systems to generate the sufficiency database 706 and/or the sufficiency listing 704 (or equivalent centralized or decentralized repositories for the storage of such data). In various embodiments, the method 800 may include elements, steps, instructions, etc. that are associated with one or more AI algorithms. For instance, method elements generally associated with tasks suitable for one or more machine learning algorithms, e.g., the generation of the dataset sufficiency-indicator(s) and/or the sufficiency parameter(s), may be included in the instructions of programs and/or subprograms corresponding to such tasks in the system architecture, e.g., the schematic logic flow for the corresponding system. In some embodiments and also in reference to FIG. 7, such method elements associated with the AI algorithm(s) may correspond to instructions for one or more of the AI program 708 or previous transfer module 712. However, the method 800 of FIG. 8 is equally applicable to other system architectures capable, suitable, etc. of performing or executing such method elements.

As shown in FIG. 8, the method 800 may include (method element 852) communicating a dataset including data that is suitable to use as input to model behavior and for subsequent representation on the sufficiency listing. Further, the actual sufficiency of the dataset is unknown. With reference also to exemplary system 700 of FIG. 7, the AI program and/or the previous transfer module 712 may receive the user communicated dataset 702 (e.g., some or all of the data stored or associated with the dataset 702). For example, the system 700 may include one or more subprograms and/or be associated with instructions allowing for communication with the dataset 702. In some embodiments, the system 700 may include one or more drivers suitable or capable of interfacing with each application and/or storage format of various suitably configured datasets 702. In some embodiments, the dataset may include synthetic data suitable for subsequent transfer of the dataset 702. In additional or alternative embodiments, the system 700, such as the AI algorithm or a dedicated system, may generate synthetic data from some or all of the data of the dataset 702. For example, data of the dataset that may be used to identify individual members of the population used to form the dataset 702 may be altered such that the identity of the members of the population is protected or reasonably protected.

Method element 854 may include modifying the sufficiency listing to include a representation of the dataset. For example, the system 700 may include one or more subprograms and/or be associated with instructions allowing the AI program 708 and/or the previous transfer module 712 to communicate with the sufficiency listing 704. For instance, the AI program 708 and/or the previous transfer module 712 may include one or more drivers suitable or capable of interfacing with the application and/or storage format of the sufficiency listing to generate the representation of the dataset 702 within the sufficiency listing 704.

The method 800 may include (e.g., method element 856) communicating sufficiency parameters from a sufficiency database. Such sufficiency parameters may be generated from at least one previous version of the sufficiency listing. With reference also to FIG. 7, the sufficiency parameters may be communicated to the AI algorithm 708 via one or more drivers suitable or capable of interfacing with the application and/or storage format of the sufficiency database 706. In some embodiments, the sufficiency parameters of the sufficiency database 708 may be formed from the sufficiency listing 704 and/or one or more previous versions of the sufficiency listing 704 (such as data associated with previous sufficiency listings **704*a* stored in the internal repository 710 and/or directly to the sufficiency database 706**), as described herein.

Additionally, the method 800 may include generating, based on data of the dataset and the sufficiency parameters of the sufficiency database, a dataset sufficiency-indicator using an artificial intelligence program, as shown in method element 858. In various embodiments, the system 700 may utilize the AI program(s) 708 in order to establish some or all of the dataset sufficiency-indicators represented on the sufficiency listing 704. Suitable AI algorithms suitable for use with the AI program 708 may include one or more machine learning programs, neural networks, CNNs, support vector algorithms, deep neural networks, decision tree learning, associate rule learning, or AI programs capable of generating the dataset sufficiency-indicator approximating the actual sufficiency of the dataset 702 for modeling purposes.

In some embodiments, method 800 may further include, in method element 860, connecting the dataset sufficiency-indicator to the dataset. For example, the dataset sufficiency-indicator may be generated in the sufficiency list 704 and associated with the representation of the dataset 702 within the same. Additionally or alternatively, the dataset sufficiency-indicator may be associated with the dataset 702 and/or the representation of the dataset 702 within the sufficiency listing as a tag. In some embodiments, e.g., method element 862, the method 800 may further include communicating to a user of the system the dataset sufficiency-indicator of the dataset and the representation of the dataset in association with the dataset. For example, the system 700 may be configured to generate a display including the representation of the dataset 702 and the dataset sufficiency indicator or otherwise output such information.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for centralized transfer of model input data, comprising:

a processor; and a memory storing instructions that when executed by the processor, cause the processor to:

receive a dataset including data that is suitable to use as input to model behavior;

determine, based on a plurality of sufficiency parameters in a sufficiency database, an actual sufficiency of the dataset for feedback to train an artificial intelligence program, wherein the plurality of sufficiency parameters are associated with one or more of a plurality of datasets, the plurality of datasets including the dataset, each dataset associated with a respective version;

train the artificial intelligence program to generate a dataset sufficiency-indicator for the dataset based on training data comprising the plurality of sufficiency parameters in the sufficiency database;

generate, by the trained artificial intelligence program, the dataset sufficiency-indicator for the dataset;

generate a tag that encodes the dataset sufficiency-indicator;

store the tag in association with the version of the dataset in the sufficiency database;

determine that the dataset sufficiency-indicator for the dataset is below a purge value;

receive additional data comprising: (i) determined sufficiency parameters for previous versions of the sufficiency database, and (ii) external sufficiency parameters associated with an external dataset, the external sufficiency parameters comprising a real-time sufficiency adjustment;

retrain, based on the additional data, the artificial intelligence program;

generate, by the retrained artificial intelligence program, another dataset sufficiency-indicator for the dataset;

determine that the another dataset sufficiency-indicator for the dataset is above the purge value;

based on the determination that the another dataset sufficiency-indicator for the dataset is above the purge value, communicate, via a network, a notification comprising an indication that the another dataset sufficiency-indicator for the dataset is above the purge value; and retrain the artificial intelligence program based on the another dataset sufficiency-indicator.

2. The system of claim 1, wherein the actual sufficiency includes a value of the dataset.

3. The system of claim 1, wherein the data of the dataset comprises synthetic data.

4. The system of claim 1, wherein the instructions, when executed by the processor, cause the processor to:

generate, from the data of the dataset, a synthetic dataset including synthetic data suitable for a subsequent transfer.

5. The system of claim 1, wherein the plurality of sufficiency parameters include at least one of an actual sufficiency for the respective dataset, a size of the respective dataset, a time-period since a transfer of the respective dataset, a granularity of the data of the respective dataset, a system retention time between when the previously transferred dataset was received by the system and the transfer of the respective dataset, or a population associated with the respective dataset.

6. The system of claim 5, wherein the real-time sufficiency adjustment includes at least one inflation indicator, a consumer confidence indicator, a consumer sentiment indicator, a size of the external dataset, a time-period since a transfer of the external dataset, a granularity of the data of the external dataset, a retention time before the transfer of the external dataset, a population associated with the external dataset, a sufficiency indicator for the external dataset, and an actual sufficiency for the transfer of the external dataset.

7. The system of claim 1, wherein the dataset sufficiency-indicator is an inference of the artificial intelligence program.

8. The system of claim 1, wherein the artificial intelligence program comprises a machine learning algorithm.

9. The system of claim 1, wherein the artificial intelligence program comprises a neural network.

10. The system of claim 1, wherein the instructions, when executed by the processor, cause the processor to:

generate another tag that encodes the another dataset sufficiency-indicator;

store the another tag in association with the version of the dataset in the sufficiency database.

11. The system of claim 10, wherein the additional data further comprises a synthetic dataset including synthetic data generated based on the dataset.

12. A computer-implemented method, comprising:

accessing, by a processor, a dataset including data that is suitable to use as input to model behavior;

determining, by the processor based on a plurality of sufficiency parameters in a sufficiency database, an actual sufficiency of the dataset, wherein the plurality of sufficiency parameters are associated with one or more of a plurality of datasets, the plurality of datasets including the dataset, each dataset associated with a respective version;

training, by the processor, an artificial intelligence program to generate a dataset sufficiency-indicator for the dataset based on training data comprising the plurality of sufficiency parameters in the sufficiency database;

generating, by the trained artificial intelligence program, the dataset sufficiency-indicator for the dataset;

generating, by the processor, a tag that encodes the dataset sufficiency-indicator;

storing, by the processor, the tag in association with the version of the dataset in the sufficiency database;

determining, by the processor, that the dataset sufficiency-indicator for the dataset is below a purge value;

receiving, by the processor, additional data comprising: (i) determined sufficiency parameters for previous versions of the sufficiency database, and (ii) external sufficiency parameters associated with an external dataset, the external sufficiency parameters comprising a real-time sufficiency adjustment;

retraining, by the processor based on the additional data, the artificial intelligence program;

generating, by the retrained artificial intelligence program, another dataset sufficiency-indicator for the dataset;

determining, by the processor, that the another dataset sufficiency-indicator for the dataset is above the purge value;

based on the determination that the another dataset sufficiency-indicator for the dataset is above the purge value, communicating, by the processor via a network, a notification comprising an indication that the another dataset sufficiency-indicator for the dataset is above the purge value; and retraining, by the processor, the artificial intelligence program based on the another dataset sufficiency-indicator.

13. The computer-implemented method of claim 12, further comprising:

generating, by the processor, another tag that encodes the another dataset sufficiency-indicator;

storing, by the processor, the another tag in association with the version of the dataset in the sufficiency database.

14. The computer-implemented method of claim 13, wherein the additional data further comprises a synthetic dataset including synthetic data generated based on the dataset.

15. A non-transitory computer-readable storage medium including instructions that when executed by a processor, cause the processor to:

receive a dataset including data that is suitable to use as input to model behavior;

determine, based on a plurality of sufficiency parameters in a sufficiency database, an actual sufficiency of the dataset for feedback to train an artificial intelligence program, wherein the plurality of sufficiency parameters are associated with one or more of a plurality of datasets, the plurality of datasets including the dataset, each dataset associated with a respective version;

train the artificial intelligence program to generate a dataset sufficiency-indicator for the dataset based on training data comprising the plurality of sufficiency parameters in the sufficiency database;

generate, by the trained artificial intelligence program, the dataset sufficiency-indicator for the dataset;

generate a tag that encodes the dataset sufficiency-indicator;

store the tag in association with the version of the dataset in the sufficiency database;

determine that the dataset sufficiency-indicator for the dataset is below a purge value;

receive additional data comprising: (i) determined sufficiency parameters for previous versions of the sufficiency database, and (ii) external sufficiency parameters associated with an external dataset, the external sufficiency parameters comprising a real-time sufficiency adjustment;

retrain, based on the additional data, the artificial intelligence program;

generate, by the retrained artificial intelligence program, another dataset sufficiency-indicator for the dataset;

determine that the another dataset sufficiency-indicator for the dataset is above the purge value;

based on the determination that the another dataset sufficiency-indicator for the dataset is above the purge value, communicate, via a network, a notification comprising an indication that the another dataset sufficiency-indicator for the dataset is above the purge value; and retrain the artificial intelligence program based on the another dataset sufficiency-indicator.

16. The non-transitory computer-readable storage medium of claim 15, including instructions, which when executed by the processor, cause the processor to:

generate another tag that encodes the another dataset sufficiency-indicator;

store the another tag in association with the version of the dataset in the sufficiency database.

17. The non-transitory computer-readable storage medium of claim 16, wherein the additional data further comprises a synthetic dataset including synthetic data generated based on the dataset.

* * * * *